June 2, 1959 S. N. HURST ET AL 2,889,152
LAWN FURNITURE
Filed July 30, 1956 2 Sheets-Sheet 1
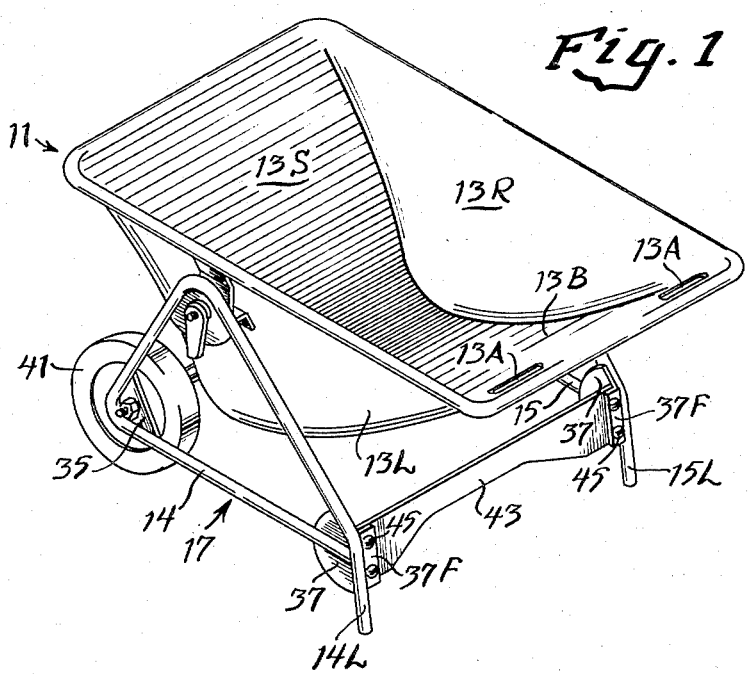
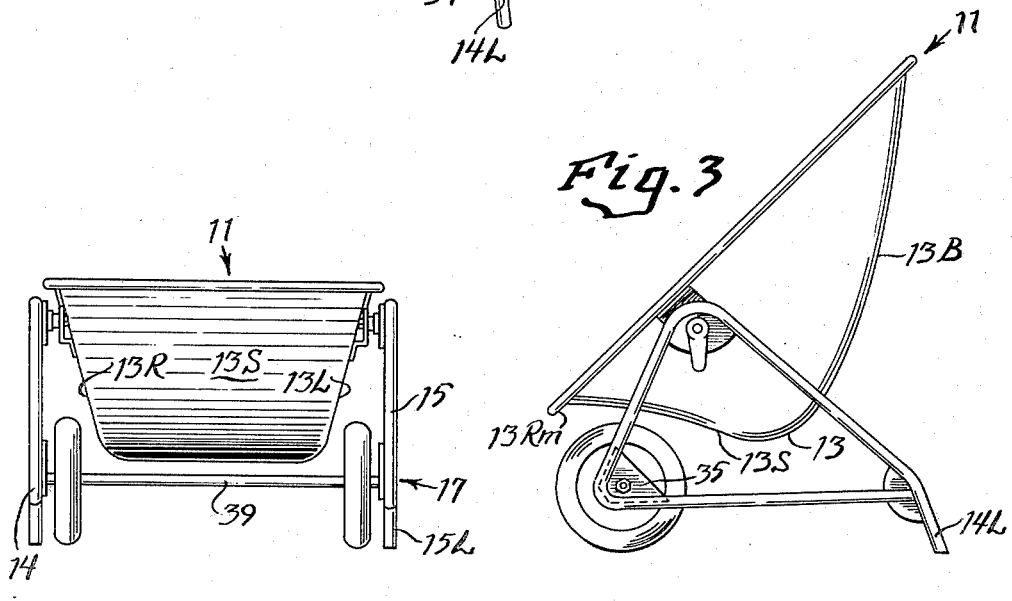
INVENTORS:
STANLEY NEWTON HURST &
VIVIAN VAUGHAN HURST
BY Ralph F. Staubly
ATTORNEY June 2, 1959  S. N. HURST ET AL  2,889,152
LAWN FURNITURE Filed July 30, 1956  2 Sheets-Sheet 2

INVENTORS:
STANLEY NEWTON HURST &
VIVIAN VAUGHAN HURST
BY Ralph F. Staubly
ATTORNEY

United States Patent Office 2,889,152
Patented June 2, 1959

2,889,152

LAWN FURNITURE

Stanley Newton Hurst and Vivian Vaughan Hurst, Manchester, Tenn.

Application July 30, 1956, Serial No. 600,925

1 Claim. (Cl. 280—47.26)

This invention relates to lawn furniture.

More particularly the invention pertains to outdoor furniture with special reference to wheelbarrows, lawn chairs and serving carts.

The primary object of this invention is to provide a versatile multi-purpose lawn device that may be used as a wheelbarrow or serving cart or lawn chair.

Additional objects are:

To provide an axially supported container, suitably contoured for comfortable seating.

To provide for the container a supporting carrier embodying a pair of wheels and axle and triangular side members.

To provide a securable, selective, positioning arrangement for the axially supported container, relative to the carrier.

To provide also, a detachable, articulated cover for the container.

These objectives and supplemental details will be further explained in the following description.

In the drawings:

Fig. 1 is a perspective view of a preferred embodiment of our invention.

Fig. 2 is a front elevational view of the showing of Fig. 1.

Fig. 3 is a side elevational view of the structure of Figs. 1 and 2.

Figure 4:
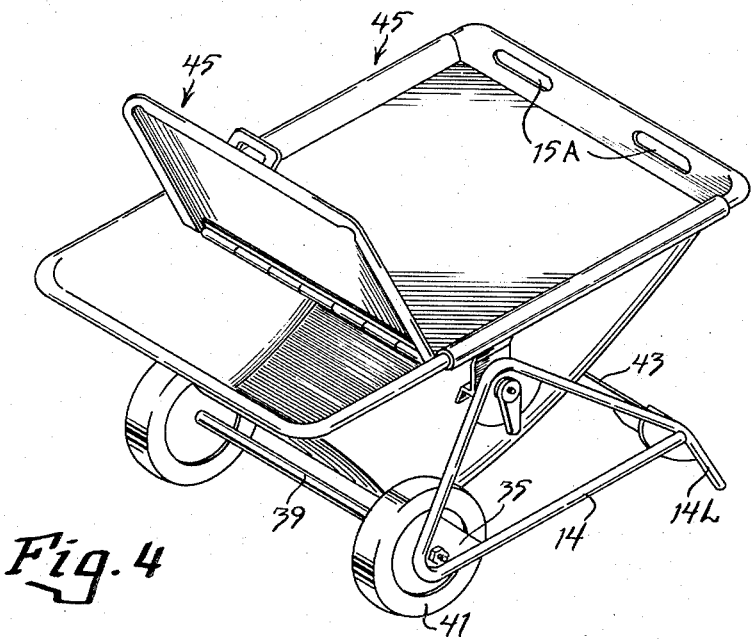
Fig. 4 is a perspective view of the structure converted to a combined drink cooler and serving cart.
Figure 5:
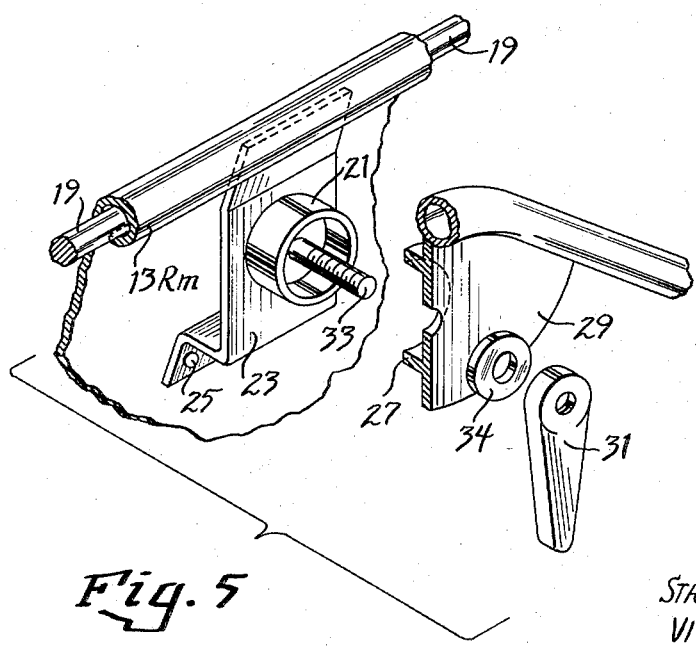
Fig. 5 is an enlarged fragmentary exploded perspective view of the pivoting and locking mechanism.

Referring now to the drawings, Fig. 1 shows a wheelbarrow device generally designated 11 and consisting of a chair-shaped container 13 suspended axially between the side members 14 and 15 of a two-wheeled carrier 17. The container 13 is fabricated in shape similar to a comfortable lounge chair (Fig. 2) with the forward portion 13S of the container 13 shaped for comfortable seating, a substantially longer back rest portion 13B and the right and left side portions 13R and 13L. These portions are integral with each other, forming a spacious and comfortable container-type seating member 13. The open edges of all portions are rolled over a reinforcing wire or rod 19 (Fig. 5) forming an open side of, or top of, generally rectangular shape. Toward the two back corners of the back rest portion 13B, elongate apertures 13A adjacent the rim provide handle means for lifting and moving the device when in use as a wheelbarrow or serving cart, as shown in Figs. 1 and 4. Means for pivotally supporting the container 13 between the chassis side members 14 and 15 are provided by short ring-type spindles 21 (Fig. 5) of substantial diameter extending in axial alignment outwardly from brackets 23 attached (as by rivets 25) to container 13 adajacent the rim 13Rm on each side, generally in line with the deepest section of the container 13. The ring-type spindles 21 may be integral with the brackets 23 or may be fabricated as by welding a short length of steel tubing thereto. The weight of the container 13 and any load therein will be supported in a pivotal manner by the ring-type spindles 21 which fit into the bearing cups 27 facing inwardly from the apex of each carrier side member 14 and 15. The bearing cups 27 are integral with the reinforcing gussets 29 at the apex of each triangular-shaped side member 14 and 15 and are somewhat less in depth than the length of the ring-type spindles 21 to allow the side members 14 and 15 to be frictionally secured to the end faces of spindles 21 by means of wing nuts 31 and clamping bolts 33. The parallel side members 14 and 15 are preferably constructed from metal tubing, formed and welded into a three-cornered or generally triangular shape having supporting legs 14L and 15L depending from the rear angle. The longer or bottom portion of each side member 14 and 15 is substantially parallel to the ground.

Approximately under the front edge of the container 13, the metal tubing is curved upwardly around the front gusset 35 forming the front angle, then it inclines rearwardly to the upper or apex angle. At the apex angle the tubing is curved around the bearing cup 27 and gusset 29 to extend downwardly and rearwardly to join the bottom portion, forming the rear angle approximately under the back edge of container 13. At the intersection with the bottom portion, the back portion of the tubing is curved downwardly in a generally vertical direction forming the short leg 14L or 15L. The bottom portion of tubing is joined to the upper end of the leg 14L or 15L by welding.

A reinforcing gusset 37 with an inwardly directed flange 37F is welded to the inner side of each side member 14 and 15 at the junction of the leg 14L or 15L, the bottom portion, and the rear portion. Gussets 35 at each lower front angle and gussets 29 at each upper angle are welded to the inward side of the curved tubing, making a matching pair of side members 14 and 15 to support container 13 in parallel spaced relationship. Bolt 33 extends outwardly through a hole in bracket 23, concentric to the ring-type spindle 21 and bearing cup 27, through a matching hole in gusset 29 to provide clamping means by which wing nuts 31 can be tightened to secure container 13 to each side member 14 or 15. Suitable holes in gussets 35 support the parallel side members 14 and 15 on axle 39 outside the spaced pair of wheels 41. A sheet-metal cross member 43 is fastened by bolts 45 at each end to the inwardly directed flange 37F of each side member 14 or 15. Cross member 43 is removable to permit disassembly of the whole device for shipping or storage.

In use the container 13 may be varied in position approximately ninety degrees by loosening and retightening wing nuts 31. The wheels 41 limit the forward swinging movement of the container 13. From the full forward position, the chair-shaped container 13 may be inclined rearwardly to any desired degree. By securing the container 13 in a horizontal position the device makes an excellent drink icer and may be covered by hinged plate 45 to provide a serving surface for picnics or barbecues, as shown in Fig. 4. However, no claim is made for a patent on this feature. Further turning adapts the container 10 for wheelbarrow use. The rear edge may be lowered to place the hand holes 15A at a convenient height for any user. Lifting by the handles 15A raises the legs 14L and 15L clear of the ground and at the same time moves the deepest section of the container 13 more directly over the wheels 41 for easier handling.

We claim:

A multi-purpose lawn device comprising a chair-shaped container having a seat portion, a back portion and associated side portions, a carrier for pivotally supporting said container, said carrier comprising a parallel spaced pair of unitary tubular side members of triangular shape, each having the longer side thereof parallel to the ground, the shorter side of each extending from the front apex to the top apex and the intermediate-length side extending from the top apex to the rear apex, a supporting leg depending from each rear apex, a transverse bar connecting the rear apexes of said side members to hold them in spaced relationship, an axle connecting the front apexes to hold them in spaced relationship, a pair of wheels mounted on said axle spaced inwardly of but closely adjacent each of said side members, bearing means adjacent each of said side-member top apexes, said bearing means being aligned to receive pivotal supporting spindles, fastening means concentric to the pivotal axis rotatably connecting said container spindle means within said bearing means, one each of said bearing means and said spindle means being rigidly mounted on adjacent portions of said container and said frame members.

References Cited in the file of this patent

UNITED STATES PATENTS

| | | |
|---|---|---|
| 1,497,478 | Bludworth | June 10, 1924 |
| 1,970,727 | Bates | Aug. 21, 1934 |
| 2,121,224 | Garlinghouse | June 21, 1938 |
| 2,308,644 | Caldemeyer | Jan. 19, 1943 |
| 2,587,881 | Oakes | Mar. 4, 1952 |

FOREIGN PATENTS

| | | |
|---|---|---|
| 436,020 | Great Britain | Oct. 3, 1935 |